(12) United States Patent
Feick (10) Patent No.: US 8,654,436 B1
(45) Date of Patent: Feb. 18, 2014

(54) PARTICLES FOR USE IN ELECTROPHORETIC DISPLAYS

(75) Inventor: Jason D. Feick, Auburndale, MA (US)

(73) Assignee: E Ink Corporation, Billerica, MA (US)

(*) Notice: Subject to any disclaimer, the term of this patent is extended or adjusted under 35 U.S.C. 154(b) by 30 days.

(21) Appl. No.: 12/915,145

(22) Filed: Oct. 29, 2010

Related U.S. Application Data (60) Provisional application No. 61/256,376, filed on Oct. 30, 2009.

(51) Int. Cl.
*G02B 26/00* (2006.01)

(52) U.S. Cl.
USPC .......................................................... 359/296

(58) Field of Classification Search
USPC .......................................................... 359/296
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,885,964 A | 5/1975 | Nacci |
| 3,892,568 A | 7/1975 | Ota |
| 4,418,346 A | 11/1983 | Batchelder |
| 4,828,617 A | 5/1989 | Csillag et al. |
| 5,679,821 A | 10/1997 | Takei et al. |
| 5,695,346 A | 12/1997 | Sekguchi et al. |
| 5,745,094 A | 4/1998 | Gordon, II et al. |
| 5,760,761 A | 6/1998 | Sheridon |
| 5,777,782 A | 7/1998 | Sheridon |
| 5,789,487 A | 8/1998 | Matyjaszewski et al. |
| 5,808,783 A | 9/1998 | Crowley |
| 5,872,552 A | 2/1999 | Gordon, II et al. |
| 5,912,283 A | 6/1999 | Hashizume et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |

(Continued)

FOREIGN PATENT DOCUMENTS

| | | |
|---|---|---|
| EP | 1 099 207 B1 | 3/2002 |
| EP | 1 145 072 B1 | 5/2003 |

(Continued)

OTHER PUBLICATIONS

Amundson, K., "Electrophoretic Imaging Films for Paper Displays" in Crawford, G. ed. Flexible Flat Panel Displays, John Wiley & Sons, Ltd., Hoboken, NJ: 2005.

(Continued)

*Primary Examiner* — James Jones
(74) *Attorney, Agent, or Firm* — David J. Cole (57) ABSTRACT

An electrophoretic medium comprises two different types of electrically charged particles in a fluid. One type of electrically charged particles comprises a dark colored particle and a second type of electrically-charged particles comprises titania having a zirconia surface treatment.

20 Claims, 3 Drawing Sheets

(56) References Cited

U.S. PATENT DOCUMENTS

| | | |
|---|---|---|
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,166,711 A | 12/2000 | Odake |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,628,258 B1 | 9/2003 | Nakamura |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,265,895 B2 | 9/2007 | Miyazaki et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |

(56) References Cited

U.S. PATENT DOCUMENTS

| | | |
|---|---|---|
| 7,420,549 B2 | 9/2008 | Jacobson et al. |
| 7,436,577 B2 | 10/2008 | Moriyama et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,666,049 B2 | 2/2010 | Saito et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini et al. |
| 7,688,297 B2 | 3/2010 | Zehner et al. |
| 7,688,497 B2 | 3/2010 | Danner et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 | 6/2010 | Danner et al. |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini et al. |
| 7,791,789 B2 | 9/2010 | Albert et al. |
| 7,843,621 B2 | 11/2010 | Danner et al. |
| 2002/0060321 A1 | 5/2002 | Kazlas et al. |
| 2002/0090980 A1 | 7/2002 | Wilcox et al. |
| 2002/0171620 A1 | 11/2002 | Gordon, II et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2004/0263947 A1 | 12/2004 | Drzaic et al. |
| 2005/0012980 A1 | 1/2005 | Wilcox et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2006/0007194 A1 | 1/2006 | Verschueren et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0128836 A1* | 6/2006 | Honda et al. ............ 523/216 |
| 2006/0181504 A1 | 8/2006 | Kawai |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2007/0013683 A1 | 1/2007 | Zhou et al. |
| 2007/0052757 A1 | 3/2007 | Jacobson |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0195399 A1 | 8/2007 | Aylward et al. |
| 2007/0201124 A1* | 8/2007 | Whitesides et al. .......... 359/296 |
| 2007/0211002 A1 | 9/2007 | Zehner et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0150888 A1 | 6/2008 | Albert et al. |
| 2008/0218839 A1 | 9/2008 | Paolini, Jr. et al. |
| 2008/0266245 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2009/0004442 A1 | 1/2009 | Danner |
| 2009/0009852 A1 | 1/2009 | Honeyman et al. |
| 2009/0034057 A1 | 2/2009 | LeCain et al. |
| 2009/0046082 A1 | 2/2009 | Jacobson et al. |
| 2009/0122389 A1 | 5/2009 | Whitesides et al. |
| 2009/0174651 A1 | 7/2009 | Jacobson et al. |
| 2009/0179923 A1 | 7/2009 | Amundson et al. |
| 2009/0195568 A1 | 8/2009 | Sjodin |
| 2009/0237773 A1 | 9/2009 | Cao et al. |
| 2009/0256799 A1 | 10/2009 | Ohkami et al. |
| 2009/0315044 A1 | 12/2009 | Amundson et al. |
| 2009/0322721 A1 | 12/2009 | Zehner et al. |
| 2010/0044894 A1 | 2/2010 | Valianatos et al. |
| 2010/0045592 A1 | 2/2010 | Arango et al. |
| 2010/0103502 A1 | 4/2010 | Jacobson et al. |
| 2010/0118384 A1 | 5/2010 | Danner et al. |
| 2010/0148385 A1 | 6/2010 | Balko et al. |
| 2010/0156780 A1 | 6/2010 | Jacobson et al. |
| 2010/0201651 A1 | 8/2010 | Baucom et al. |
| 2010/0207073 A1 | 8/2010 | Comiskey et al. |
| 2010/0265239 A1 | 10/2010 | Amundson et al. |

FOREIGN PATENT DOCUMENTS

| | | |
|---|---|---|
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al,, "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, C.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

(56) References Cited

OTHER PUBLICATIONS

Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1 SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan; B. et al.; "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1373 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

\* cited by examiner

PARTICLES FOR USE IN ELECTROPHORETIC DISPLAYS

REFERENCE TO RELATED APPLICATIONS

This application claims benefit of copending Application Ser. No. 61/256,376, filed Oct. 30, 2009.

This application is also related to:
(a) U.S. Pat. No. 6,822,782;
(b) U.S. Pat. No. 7,411,720;
(c) U.S. Pat. No. 7,230,750;
(d) U.S. Pat. No. 7,375,875;
(e) U.S. Pat. No. 7,532,388;
(f) U.S. Pat. No. 7,002,728;
(g) U.S. Pat. No. 7,247,379;
(h) U.S. Pat. No. 7,679,814;
(i) copending application Ser. No. 12/188,648, filed Aug. 8, 2008 (Publication No. 2009/0009852);
(j) copending application Ser. No. 12/121,211, filed May 15, 2008 (Publication No. 2008/0266245) and
(k) International Application Publication No. WO 2010/091938

The entire contents of these patents and copending applications, and of all other U.S. patents and published and copending applications mentioned below, are herein incorporated by reference.

BACKGROUND OF INVENTION

This invention relates to electrophoretic particles (i.e., particles for use in an electrophoretic medium) and processes for the production of such electrophoretic particles. This invention also relates to electrophoretic media and displays incorporating such particles. More specifically, this invention relates to white, titania-based electrophoretic particles.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Nevertheless, problems with the long-term image quality of electrophoretic displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; and 7,679,814; and 7,746,544; and U.S. Patent Applications Publication Nos. 2005/0012980; 2006/0202949; 2008/0013155; 2008/0013156; 2008/0266245 2008/0266246; 2009/0009852; 2009/0206499; 2009/0225398; 2010/0045592; 2010/0148385; and 2010/0207073;

(b) Capsules, binders and encapsulation processes; see for example U.S. Pat. Nos. 6,922,276; and 7,411,719;

(c) Films and sub-assemblies containing electro-optic materials; see for example U.S. Pat. No. 6,982,178; and U.S. Patent Application Publication No. 2007/0109219;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 7,012,600; and 7,453,445;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

However, the electro-optical properties of electrophoretic displays could still be improved. Typically, an electrophoretic display is designed to have black and white extreme optical states; color can then be produced by providing color filters adjacent the electrophoretic medium. One of the main advantages of electrophoretic displays is that they can closely mimic the appearance of printing on paper; hence such displays are often used in electronic document readers (usually called "E-book readers" but the term "electronic document readers" is preferred as such devices are often used for reading electronic versions of printed publications other than books, for example maps, newspapers and magazines). It is desirable that electrophoretic displays used in such readers be able to imitate accurately the appearance of all types of books, including the dense black printing on very white paper used in expensive books, and although current electrophoretic displays provide an easily readable text display, they have not quite reached the high standard of the best printed books.

Some prior art commercial dual particle electrophoretic displays used polymer coated titania as the white particle and polymer coated carbon black as the dark particle; see for example, U.S. Pat. No. 6,822,782, especially Examples 27-30. Such displays did not provide a dark state as dark as is desirable. Black pigments capable of providing darker dark states have been developed; see for example, U.S. Pat. No. 7,002,728 (copper chromite based particles) and International Application Publication No. WO 2010/091398 (particles based upon high surface area metal oxides, especially certain mixed metal oxides). However, there is still room for improvement in the dark state of electrophoretic displays, especially since it transpires that the dark state of a display is of critical importance in obtaining optimum color performance when a color filter is used with a display, and that the dark states of prior art electrophoretic displays still adversely affect the color gamut of such displays.

It has now surprising been found that the dark state of a dual particle electrophoretic can be significantly improved by the choice of the white pigment used in the display, and the present invention relates to preferred white pigments and electrophoretic media and displays using these preferred white pigments.

SUMMARY OF INVENTION

Accordingly, this invention provides an electrophoretic medium comprising at least two different types of electrically charged particles in a fluid and capable of moving through the fluid on application of an electrical field to the fluid, wherein one type of electrically charged particles comprises a dark colored particle and a second type of electrically-charged particles comprises titania having a zirconia surface treatment.

In such an electrophoretic medium, the titania particles may have a zirconia alumina surface treatment. The titania particles may have an average diameter of from about 0.2 to about 0.5 µm, and a surface area of from about 8 to about 24 $m^2/g$ by BET. The titania particles may have a polymer chemically bonded to, or cross-linked around, them. It is generally preferred that the polymer be chemically bonded to the titania particle. The polymer may comprise from about 1 to about 15 percent by weight, preferably from about 4 to about 14 percent by weight, of the titania particle. The polymer may comprise charged or chargeable groups, for example amino groups. The polymer may also comprise a main chain and a plurality of side chains extending from the main chain, each of the side chains comprising at least about four carbon atoms. The polymer may be formed from an acrylate or a methacrylate.

The dark colored particles used in the present process may be as described in the aforementioned U.S. Pat. No. 7,002,728 or WO 2010/091398.

In the electrophoretic medium of the invention, the fluid may be gaseous or liquid, and in the latter case may comprise a hydrocarbon, or a mixture of a hydrocarbon and a chlorinated hydrocarbon.

The electrophoretic medium of the present invention may be of the encapsulated type and comprise a capsule wall within which the fluid and the electrically charged particles are retained. Such an encapsulated medium may comprise a plurality of capsules each comprising a capsule wall, with the fluid and electrically charged particle retained therein, the medium further comprising a polymeric binder surrounding the capsules. Alternatively, the medium may be of the microcell or polymer-dispersed types discussed above.

This invention also provides an electrophoretic medium comprising electrically charged particles in a fluid and capable of moving through the fluid on application of an electrical field to the fluid, wherein at least one electrically charged particle comprises titania having a zirconia surface treatment.

This invention extends to an electrophoretic display comprising an electrophoretic medium of the present invention and at least one electrode disposed adjacent the electrophoretic medium for applying an electric field to the medium. In such an electrophoretic display, the electrophoretic medium may comprises a plurality of capsules. Alternatively, the electrophoretic medium may be of the polymer-dispersed type and comprise a plurality of droplets comprising the fluid and the electrically charged particles, and a continuous phase of a polymeric material surrounding the droplets. The electrophoretic display may also be of the microcell type and comprise a substrate having a plurality of sealed cavities formed therein, with the suspending fluid and the electrically charged particles retained within the sealed cavities.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

In another aspect, this invention provides a titania particle having a zirconia surface treatment and a polymer chemically bonded to the particle. The polymer may comprise from 1 to about 15 percent by weight, preferably from about 4 to about 14 percent by weight, of the particle. The polymer may comprise charged or chargeable groups, for example amino groups. The polymer may comprise a main chain and a plurality of side chains extending from the main chain, each of the side chains comprising at least about four carbon atoms. The polymer may be formed from an acrylate or a methacrylate. The titania particles may have a zirconia alumina surface treatment, and may have an average diameter of from about 0.2 to about 0.5 µm (towards the lower end of the size range of titania particles conventionally used in electrophoretic displays), and a surface area of from about 8 to about 24 $m^2/g$ by BET.

DETAILED DESCRIPTION

As indicated above, the present invention provides an electrophoretic medium comprising a fluid, and titania particles having a zirconia, and preferably a zirconia alumina, surface treatment. The electrophoretic medium may also comprise dark electrophoretic particles.

The dark particles used in the electrophoretic medium of the present invention may be any of those known in the art. Preferred dark particles are copper chromite or an inorganic black pigment having a surface area of at least about 7 $m^2/g$. In the latter case, preferred black pigments are metal oxides, for example magnetite, ($Fe_3O_4$), and mixed metal oxides containing two or more of iron, chromium, nickel, manganese, copper, cobalt, and possibly other metals. Two specific useful pigments are copper iron manganese oxide spinel and copper chromium manganese oxide spinel (available from the same company as Black 20C920). The dark particles are preferably polymer coated using the techniques described in U.S. Pat. Nos. 6,822,782; 7,230,750; 7,375,875; and 7,532,388.

Titania having a zirconia alumina surface treatment (hereinafter called "ZA titania") suitable for use in the present electrophoretic medium is available commercially from various sources. One commercial pigment which has been found to give good results is Tronox CR-828, available from Tronox Incorporated, One Leadership Square, Suite 300, 211 N. Robinson Avenue, Oklahoma City, Okla. 73102-7109. This pigment is a zirconia alumina pacified titanium dioxide with weight mean average size of about 0.350 µm, specific gravity of 4.1, and surface area of 16 $m^2/g$. For optimum results, the titania particles should be polymer coated using the techniques described in U.S. Pat. Nos. 6,822,782; 7,230,750; 7,375,875; and 7,532,388. Typically, such a polymer coating is produced by first treating the ZA titania with a silane having one functional group capable of reacting with the ZA titania surface and a second functional group capable of undergoing polymerization. The silane-treated titania is then treated with a polymerizable monomer or oligomer in the presence of a polymerization catalyst so as to cause formation of polymer chemically bonded to the titania particle.

In addition to producing darker dark states than similar electrophoretic media using prior art titania-based pigment particles, preferred electrophoretic media of the present invention also display improved charging of the white pigment and increased black-to-white switching speed, as illustrated in the Examples below.

The following Examples are now given, though by way of illustration only, to show details of preferred reagents, conditions and techniques used in the present invention.

Example 1

Preparation of Polymer-Coated ZA Titania Particles

Part A: Preparation of Silane-Treated Titania

ZA titania (Tronox CR-828) was surface-functionalized using N-3-(trimethoxysilyl)-propyl]methacrylate (available from Dow Chemical Company under the trade name Z-6030) substantially as described in the aforementioned U.S. Pat. No. 6,822,782, Example 28, Part A. The amount of surface functionalization was estimated by thermogravimetric analysis (TGA), which indicated the presence of approximately 2.2% of volatile (organic) material, representing substantially more than a monolayer of the silane.

Part B: Polymer Coating of Silane-Treated Titania

The silanized pigment produced in Part A above was treated to produce a surface-grafted polymer layer substantially as described in the aforementioned U.S. Pat. No. 6,822,782, Example 28, Part B. This process resulted in a final pigment containing 8-10% volatile material by TGA.

Example 2

Preparation of Capsules Containing Polymer-Coated ZA Titania Particles

Gelatin-acacia capsules containing the polymer-coated ZA titania particles prepared in Example 1 above, and similar capsules containing a prior art polymer-coated titania with a silica alumina surface treatment (hereinafter "SA titania"), were prepared substantially as described in Example 2 of application Ser. No. 12/702,566, filed Feb. 19, 2010 (see the same Example in the corresponding International Application WO 2010/091398).

Example 3

Preparation of Experimental Electrophoretic Displays

The capsules were allowed to settle and excess water was decanted. The resulting capsule slurry was adjusted to pH 9-9.5 with 10 weight percent ammonium hydroxide solution. The capsules were then concentrated by centrifugation and the supernatant liquid discarded. The capsules were mixed with an aqueous urethane binder at a ratio of 1 part by weight binder to 8 parts by weight of capsules and surfactant and hydroxypropylmethyl cellulose were added and mixed thoroughly.

The mixture thus produced was bar coated, using a 4 mil (101 µm) coating slot on to an indium-tin oxide (ITO) coated polyester film, the capsules being deposited on the ITO-coated surface of the film at a target coating thickness of 18 µm, and the resultant coated film was dried in a conveyor oven at 60° C. for approximately 2 minutes.

Separately, a polyurethane lamination adhesive was coated on the a release sheet to form a dried adhesive layer 25 µm thick, and the resultant coated sheet was cut to a size slightly smaller than that of a capsule-coated film piece. The two sheets were then laminated together (with the lamination adhesive in contact with the capsule layer) by running them through a hot roll laminator with both rolls set to 120° C. to form a front plane laminate as described in U.S. Pat. No. 6,982,178. The front plane laminate was then cut to the desired size, the release sheet removed, and the lamination adhesive layer thereof laminated to a 2 inch (51 mm) square backplane comprising a polymeric film covered with a graphite layer, the lamination adhesive being contacted with the graphite layer. This second lamination was effected using the same laminator but with both rolls at 93° C. The laminated pixels were cut out using a laser cutter, and electrical connections applied to produce experimental single-pixel displays suitable for use in the electro-optic tests described below.

Example 4

Electro-Optic Tests

The following test results are based upon measurements taken from seven single-pixel displays using the white pigment of the invention and seven single-pixel displays using the prior art white pigment, all being prepared as described in Example 3 above. In each of the accompanying drawings, "ZAT" denote the medium of the invention using ZA titania, while "SAT" denoted the medium using the prior art SA titania.

Figure 1:
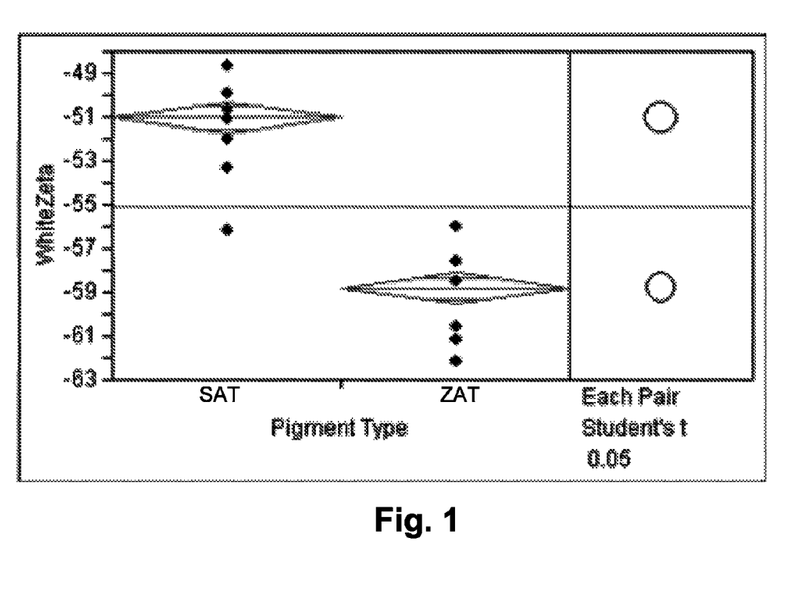
FIG. 1 of the accompanying drawings is a graph showing the zeta potentials of a white pigment of the present invention and a similar prior art pigment, as measured in experiments described in Example 4 below.

Firstly, the zeta potentials of the white pigments were measured by standard methods, and the results are shown in FIG. 1 of the accompanying drawings, from which it will be seen that the ZA titania used in the present invention charged substantially more negatively than the prior art white pigment. (It will be appreciated that the greater zeta potential provided by the ZA titania particles of the present invention will be useful in electrophoretic media in which no dark particles are present, for example an electrophoretic medium in which the fluid is dyed and the ZA titania particles are the only particles present. The higher zeta potential provided by the ZA titania will tend to result in faster switching of such displays.)

Figure 2:
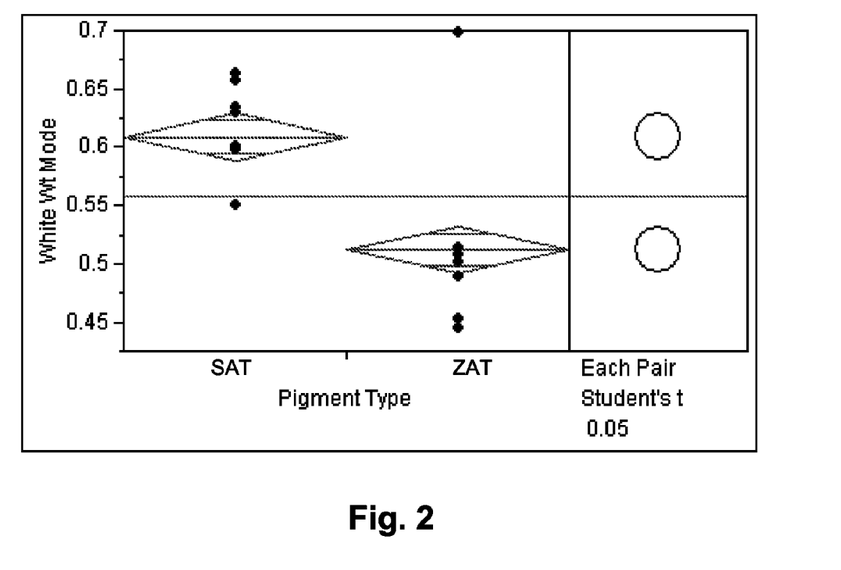
FIG. 2 is a graph showing the particle sizes of the same pigments as in FIG. 1 above.

The particle size of the white pigments were also measured by standard methods, and the results for the mode of particle size (in microns) are shown in FIG. 2. From this Figure it will be seen that the ZA titania is generally smaller than the SA titania, which according to accepted scattering theory should improve the white state of the electrophoretic medium, although no such improved white state was observed experimentally.

Figure 3:
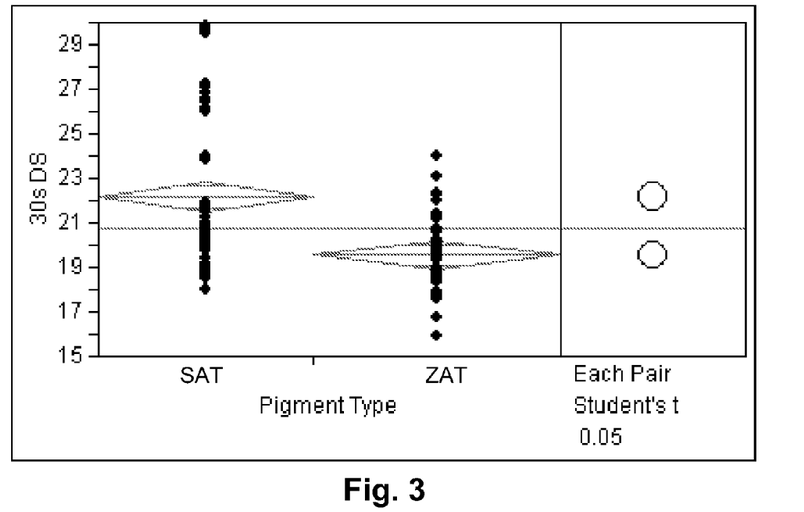
FIGS. 3 and 4 are graphs showing respectively the dark state and light state L* values of experimental dual particle displays produced using the same pigments as in FIG. 1 above.
Figure 4:
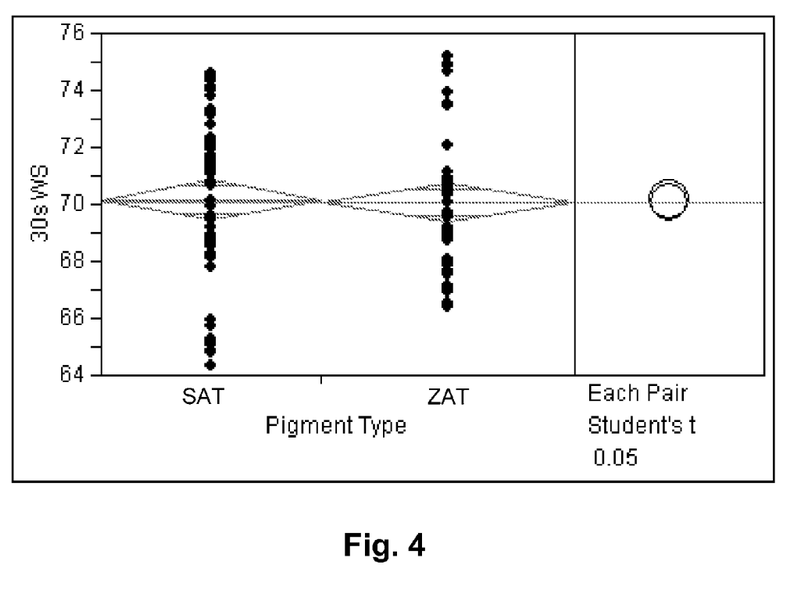

Next, the extreme (black and white) optical states of the experimental displays produced as described above were tested by switching them through several transitions between their extreme black and white optical states. The display was driven to both its extreme optical states using, then 15 V 240 millisecond drive pulses. The reflectance of the optical state produced by the driving pulse was measured 30 seconds after the end of the drive pulse; this delay in measuring allows certain short term effects which occur after the drive pulse ends to dissipate and provides a value representative of that perceived by, for example, a user of a E-booker reader reading in a normal manner. The measured reflectances were converted to L* units, where L* has the usual CIE definition. FIG. 3 of the accompanying drawings shows the dark state L* values obtained, while FIG. 4 shows the light state L* values, in both cases for both the displays of the present invention and the prior art displays.

From FIG. 3, it will be seen that the ZA titania particles of the present invention provided displays with substantially darker dark states than the prior art SA titania particles. The mean dark state L* for the displays of the invention was 19.56, and for the prior art displays 22.28; in both cases the standard error was less than 0.35, so that the difference between the two means exceeded seven standard errors. From FIG. 4, it will be seen that there was no substantial difference between the light states of the two types of displays. The mean light state L* for the displays of the invention was 70.04±0.33, and for the prior art displays 70.15±0.36, so that the difference between the two displays was less than half the standard error.

The improved dark state of the displays of the present invention resulted in a contrast ratio (after the aforementioned 30 second delay) of 14, significantly better than the contrast ratio of 11 for the prior art displays.

Figure 5:
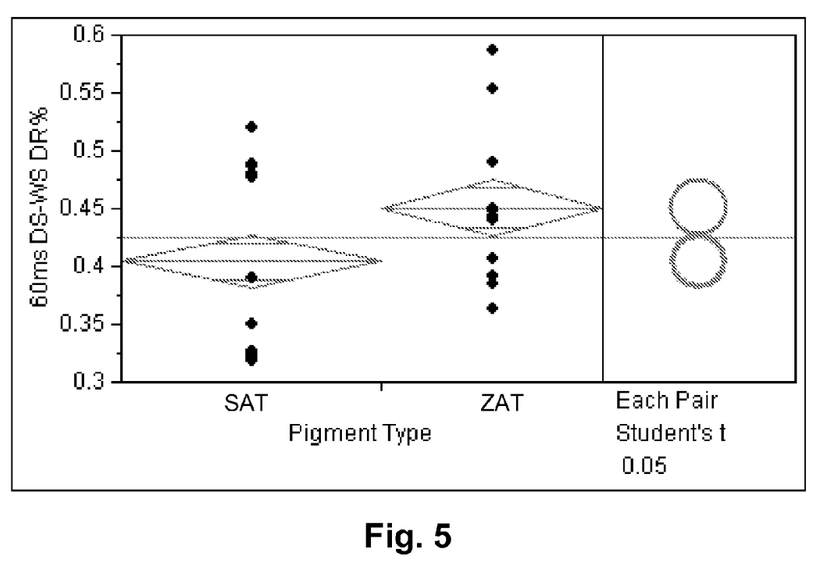
FIG. 5 is a graph comparing the switching speeds of the dual particle displays used to generate the data shown in FIGS. 3 and 4.

During the foregoing experiments, it was observed that the display of the present invention appeared to switch more rapidly than the prior art displays. To quantify this quicker switching, a final series of experiments were conducted, in which the displays were repeatedly switched between their extreme black and white optical states as before, driven to their extreme black optical state using a 15 V 240 millisecond drive pulse, and then a 15 V 60 millisecond drive pulse was applied to drive the displays part way toward their white state. The displays were then allowed to stand undriven for 30 seconds after the end of the 15 V 60 millisecond drive pulse and their reflectances were measured and converted to L* units. The results are shown in FIG. 5, which plots the L* change achieved by the 15 V 60 millisecond drive pulse as a fraction of the total L* change achieved by the 15 V 240 millisecond drive pulse. From this Figure, it will be seen that the displays of the present invention did indeed achieve a greater fraction of the black-white transition as a result of the 60 millisecond drive pulse than did the prior art displays. The mean values are 45.06±1.23% for the displays of the invention and 40.47±1.13% for the prior art displays, so that the difference is significant to a high level of confidence.

From the foregoing, it will be seen that the present invention can provide displays having darker dark states, higher contrasts ratios and more rapid switching speeds than the prior art displays. The present invention also provides white electrophoretic particles having larger zeta potentials than in prior art displays. These advantages can be achieved without major changes to the manufacturing processes for the displays, or major capital investment, since the present invention can be implemented by simply replacing one commercial titania starting material with another and minor variations in the subsequent manufacturing steps.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising at least two different types of electrically charged particles in a fluid and capable of moving through the fluid on application of an electrical field to the fluid, wherein one type of electrically charged particles comprises a dark colored particle and a second type of electrically-charged particles comprises titania having a zirconia surface treatment.

2. An electrophoretic medium according to claim 1 wherein the titania particles have a zirconia alumina surface treatment.

3. An electrophoretic medium according to claim 1 wherein the titania particles may have an average diameter of from about 0.2 to about 0.5 μm, and a surface area of from about 8 to about 24 $m^2/g$ by BET.

4. An electrophoretic medium according to claim 1 wherein the titania particles may have a polymer chemically bonded to, or cross-linked around, them.

5. An electrophoretic medium according to claim 4 wherein the polymer is chemically bonded to the titania particle.

6. An electrophoretic medium according to claim 4 wherein the polymer comprises from about 1 to about 15 percent by weight of the titania particle.

7. An electrophoretic medium according to claim 6 wherein the polymer comprises from about 4 to about 14 percent by weight of the titania particle.

8. An electrophoretic medium according to claim 4 wherein the polymer comprises a main chain and a plurality of side chains extending from the main chain, each of the side chains comprising at least about four carbon atoms.

9. An electrophoretic medium according to claim 1 wherein the fluid is gaseous.

10. An electrophoretic medium according to claim 1 comprising a capsule wall within which the fluid and electrically charged particles are retained.

11. An electrophoretic medium according to claim 10 comprising a plurality of capsules each comprising a capsule wall, with the fluid and electrically charged particle retained therein, the medium further comprising a polymeric binder surrounding the capsules.

12. An electrophoretic medium according to claim 1 comprising a plurality of discrete droplets comprising the fluid and electrically charged particles, the droplets being dispersed within a continuous phase of a polymeric material.

13. An electrophoretic medium according to claim 1 wherein the fluid and the electrically charged particles are retained within a plurality of cavities formed within a carrier medium.

14. An electrophoretic display comprising an electrophoretic medium according to claim 1 and at least one electrode disposed adjacent the electrophoretic medium for applying an electric field to the medium.

15. An electrophoretic display according to claim 14 in the form of an electronic book reader, portable computer, tablet computer, cellular telephone, smart card, sign, watch, shelf label or flash drive.

16. An electrophoretic medium comprising electrically charged particles in a fluid and capable of moving through the fluid on application of an electrical field to the fluid, wherein at least one electrically charged particle comprises titania having a zirconia surface treatment.

17. An electrophoretic medium according to claim 16 wherein the titania particles have a zirconia alumina surface treatment.

18. An electrophoretic medium according to claim 16 wherein the titania particles may have an average diameter of from about 0.2 to about 0.5 μm, and a surface area of from about 8 to about 24 $m^2/g$ by BET.

19. An electrophoretic display comprising an electrophoretic medium according to claim 16 and at least one electrode disposed adjacent the electrophoretic medium for applying an electric field to the medium.

20. An electrophoretic display according to claim 19 in the form of an electronic book reader, portable computer, tablet computer, cellular telephone, smart card, sign, watch, shelf label or flash drive.

* * * * *